May 24, 1960 F. C. GESUALDI 2,937,584
CAMERA ADAPTER FOR TELESCOPES
Filed Oct. 1, 1958
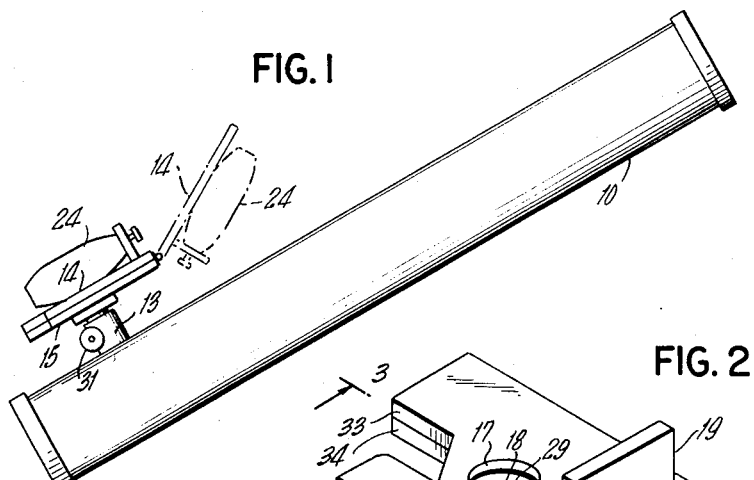
FIG. 1
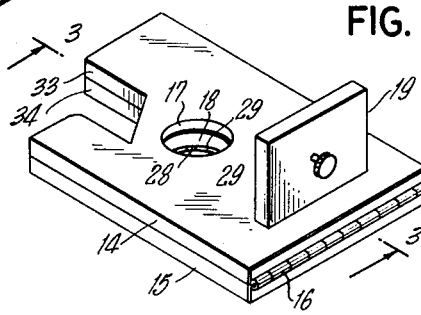
FIG. 2
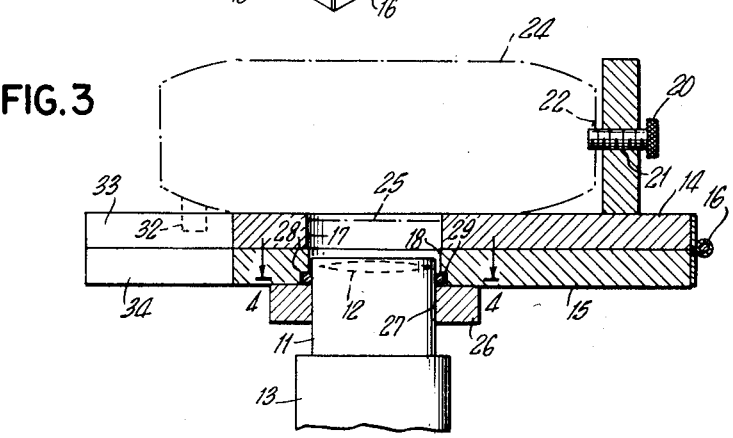
FIG. 3
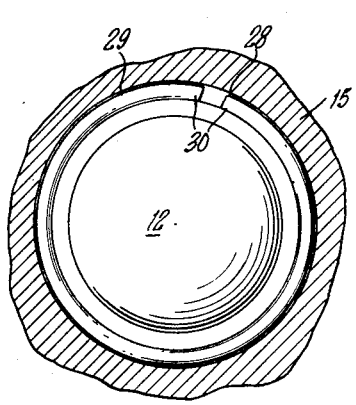
FIG. 4
FIG. 5
INVENTOR.
FRANK C. GESUALDI
BY
J. Ledermann
ATTORNEY United States Patent Office 2,937,584
Patented May 24, 1960

2,937,584

CAMERA ADAPTER FOR TELESCOPES

Frank C. Gesualdi, 122 McDougall St., New York 12, N.Y.

Filed Oct. 1, 1958, Ser. No. 764,586

1 Claim. (Cl. 95—12)

This invention relates to camera adapters for telescopes, that is, to adapters by the aid of which a camera may be applied to the eye piece of the telescope so that the object focused therein may be photographed. The adapter illustrated herein, merely by way of example, is particularly adaptable to reflector telescopes of the type used by amateurs, for the utilization of a box type of camera.

A more particular object of the invention is the provision of an adapter such as mentioned above, consisting of two mutually hinged parts or plates one of which is provided with means for fastening the camera thereto, the plates having holes therein which are aligned when the plates are folded together, the camera being so positioned as to align its lens with the said aligned holes. Means is further provided to secure the lower plate to the telescope eyepiece. When the upper plate is swung out of the way, the operator may place his eye at the hole in the lower plate and adjust the eyepiece to focusing position so that when the upper plate is swung back to superposition on the lower plate the camera lens will be properly focused.

A further object of the invention is the provision of normally aligned cut-outs in the hinged plates to give the operator ready access to the shutter operating lever.

The above as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details shown or described.

Referring briefly to the drawing,

Fig. 1 is a side elevational view of a telescope utilizing the camera adapter of the present invention.

Fig. 2 is a top perspective view of the adapter per se.

Fig. 3 is a sectional view taken on the line 3—3 of Fig. 2 but includes the telescope eyepiece on which the adapter is mounted and shows a camera, in phantom, in position thereon.

Fig. 4 is a sectional view taken on the line 4—4 of Fig. 3.

Fig. 5 is a sectional view similar to Fig. 4 but with the telescope eye piece omitted, that is, when the adapter is not mounted on the eyepiece.

Referring in detail to the drawing, the numeral 10 indicates the tube of a telescope which is understood to be supported on a suitable mounting or tripod, not shown, the telescope shown being of the reflector type. In this form of telescope the eyepiece 11, containing a lens 12, is slidably mounted in a tube or column 13 at right angles to the telescope tube 10.

The adapter comprises a pair of similarly-shaped plates 14 and 15 hinged together at 16 and provided with aligned holes 17 and 18, respectively. The normally upper plate 14 has, longitudinally spaced from its hole 17, a wall or support 19 extending upward therefrom at right angles thereto. A thumb screw 20 of any desired form extends threadably through a threaded opening 21 through this wall and is adapted to register in the threaded hole 22 found at the bottom of a standard camera by means of which the camera is adapted to be secured to a tripod. A suitable camera for the purpose of the invention is illustrated at 24, and its object lens is shown at 25.

The hole 17 is slightly larger in diameter than the hole 18, and the lower plate 15 has a collar 26 on the bottom thereof, concentric with the holes 17 and 18, having the opening 27 therethrough of slightly smaller diameter than the hole 18.

At, preferably, the junction of the collar 26 with the lower surface of the plate 15, a circumferential groove 28 is provided in the wall of the hole 18, in which a split ring 29 registers in the normally inoperative position shown in Fig. 5. The spring is normally tensed to contract into the latter position so that it partly protrudes radially inward from the groove to its maximum degree. The two opposed ends of the split ring are indicated at 30.

In mounting the device on the eyepiece 11, with the camera in position as illustrated in phantom in Fig. 4 on the plate 14, the latter is swung about the hinge 16 clear of the plate 15. The plate 15 is then mounted on the eyepiece 11 by passing the eyepiece through the hole 27 of the collar, in which the eyepiece fits rather snugly, and upward through the spring 29 which it expands and thus pushes it radially farther into its groove 28. When the lens end of the eyepiece 11 is sufficiently elevated above the level of the spring 28, it is apparent that the plate 15 will be stably supported on the eyepiece.

As the next step the operator applies his eye to the lens 12 through the opening 18 and adjusts the eyepiece, by means of the usual operating screw 31, to focusing position. Finally the top plate 14 is swung back to superimposed position on the lower plate, whence the camera lens 25 will be positioned at the proper focus for the object viewed through the telescope.

It is to be noted that what is normally the front of the camera is now the bottom, so that the operating lever of the shutter, or the trigger 32 is at the left-hand end of the bottom of the camera, Fig. 3. In order that the operator may have ready access to this trigger, both plates are provided with aligned cut-outs, 33 and 34.

With the use of the adapter of the present invention satisfactory photographs of objects viewed in the telescope, both celestial and terrestrial, may readily be made by any amateur.

Obviously modifications in form or structure may be made without departing from the spirit or scope of the invention. For example, the adapter as described above is particularly suitable for one type of camera. For other types both holes 17 and 18 may be of the same diameter or the latter may be of larger diameter than the former. Further, the collar 26 may constitute any projection of uniform thickness around the opening 27 thereof, extending downwardly from the plate 15, or the plate 15 itself may be made of greater thickness than that shown, say of a thickness equal to the sum of those of the plate and the collar.

The invention having thus been described, what is claimed and desired to be secured by Letters Patent is as follows:

The combination of a camera having a threaded tripod-attaching hole in the normally bottom wall thereof, and a camera adapter for the eyepiece of a telescope comprising two plates mutually hinged at one end, one of the plates being normally the upper plate and the other of the plates being normally the lower plate and having the upper plate superimposed thereon, said plates having normally aligned smooth circular openings therethrough, the lower plate having a downwardly extending enlargement thereon provided with a smooth circular opening therethrough aligned with the openings in the upper and lower plates and having a diameter nearly equal to but not smaller than the eyepiece of the telescope, means on said upper plate for supporting a camera thereon in position with the object lens thereof aligned with the opening in the upper plate, the eyepiece being adapted to be slid upward through said last-named opening into said opening in the lower plate, and means positioned in the opening in the lower plate for clamping the upper plate on the eyepiece, said camera supporting means comprising a wall extending upward from the upper plate and having a threaded screw passing therethrough parallel with the upper plate adapted to register in said tripod attaching hole of the camera, said lower plate having a circumferential groove in the wall surrounding the opening therethrough, said last-named means comprising a split resilient ring registering in the groove and normally tensed to protrude radially outward from the groove into the lower plate opening and being adapted to be expanded radially outward from the opening by the eyepiece upon sliding of the eyepiece upward as aforesaid.

References Cited in the file of this patent

UNITED STATES PATENTS

| | | |
|---|---|---|
| 1,470,770 | Siedentopf | Oct. 16, 1923 |
| 1,973,542 | Shull | Sept. 11, 1934 |
| 2,679,197 | Francisco | May 25, 1954 |
| 2,753,760 | Braymer | July 10, 1956 |